United States Patent

Bertrand et al.

[11] Patent Number: 5,586,860
[45] Date of Patent: Dec. 24, 1996

[54] TURBO AERO ENGINE PROVIDED WITH A DEVICE FOR HEATING TURBINE DISKS ON REVVING UP

[75] Inventors: Jean-Louis Bertrand, Livry S/Seine; Gilles A. Charier, La Grande Paroisse; Xavier J.A. Guyonnet, St. Fargeau Ponthierry; Jean-Louis Picard, Vaux le Penil, all of France

[73] Assignee: Societe Nationale d'Etude et de Construction de Moteurs d'Aviation "Snecma", Paris, France

[21] Appl. No.: 332,101

[22] Filed: Oct. 31, 1994

[30] Foreign Application Priority Data

Nov. 3, 1993 [FR] France ..................... 93 13044

[51] Int. Cl.⁶ ................. F01D 5/08; F01D 11/12
[52] U.S. Cl. ............. 415/115; 415/134; 415/174.4; 415/174.5; 415/176; 415/177; 415/178; 416/96 R; 60/39.75
[58] Field of Search .................... 415/115–117, 134, 415/135, 176, 177, 178, 174.2, 174.3, 174.4, 174.5; 416/96 R, 97 R; 60/39.07, 39.75

[56] References Cited

U.S. PATENT DOCUMENTS

| | | | |
|---|---|---|---|
| 4,332,133 | 6/1982 | Schwarz et al. | 415/115 |
| 4,662,821 | 5/1987 | Kervistin et al. | 415/174.5 |
| 4,882,902 | 11/1989 | Reigel et al. | 415/115 |
| 5,271,711 | 12/1993 | McGreehan et al. | 415/116 |

FOREIGN PATENT DOCUMENTS

| | | | |
|---|---|---|---|
| 0468782A3 | 1/1992 | European Pat. Off. | |
| 2018362 | 10/1979 | United Kingdom | 60/39.75 |
| 2135394 | 8/1984 | United Kingdom | |

Primary Examiner—Edward K. Look
Assistant Examiner—Christopher Verdier
Attorney, Agent, or Firm—Oblon, Spivak, McClelland, Maier & Neustadt, P.C.

[57] ABSTRACT

Turbo aero engine including a heating arrangement for the internal portions (12) of turbine disks on revving up so as to reduce the temperature gradient in the disks. Heating gas passes through pipes (11) integral with the stator and reheats the disks by passing through a gasket (13) designed with the tongues (18) and orifices (20 and 22) which allow the gas to circulate towards the zones to be heated when the revving up has firstly heated the portions of the machine close to the pipes (11) and then makes it possible to interrupt the communication when the temperatures even out and the original heat expansions become uniform and offset the orifices (20 and 23).

13 Claims, 7 Drawing Sheets

5,586,860

TURBO AERO ENGINE PROVIDED WITH A DEVICE FOR HEATING TURBINE DISKS ON REVVING UP

FIELD OF THE INVENTION

The invention concerns a turbo aero engine including means for heating turbine disks on revving up when they are subjected to significant heatings.

BACKGROUND OF THE INVENTION

A large number of patents exist in which certain turbo aero engine elements are heated or more frequently cooled by taking the air or gases from other portions of the machine via a derivation circuit. The aim is generally to provoke heat expansions or contractions on these elements so as to reduce the plays between the free ends of vanes of turbines or compressors and the walls in front of these free ends and limit any leaks and output losses.

The situation on revving up of the machine, for example on the take-off of an aircraft if the machine is a turbojet engine, does pose specific problems as the most significant heating, which is suddenly produced on account of increasing the flow of hot gas, concerns firstly the turbine vanes and peripheral portions of turbine disks adjacent to these vanes. As a result, a heat gradient forms on the turbine disks whose central portions only heat up slowly, and the original heat stresses which appear require that heavier turbine disks be designed than would otherwise be the case.

SUMMARY OF THE INVENTION

The purpose of the invention is thus to tackle the heat gradient produced on revving up by heating during these periods the center of a turbine disk of the machine, which more frequently—though not invariably—is a high pressure turbine, by means of a heating system which would be cut off automatically as soon as an economic speed is reached and the temperature becomes more uniform in the machine.

In its most general form, the invention concerns a turbo aero engine including a rotor, a stator, a combustion chamber upstream of a turbine belonging to the rotor and partly constituted by a disk, wherein it includes a channel for sending and blowing hot gas from a drawing off zone of the turbo aero engine to a central zone of the disk, the sending or communication channel being composed of one portion opening into the drawing off zone and integral with the stator, and another portion integral with the rotor, both portions being joined by an annular assembly including concentric walls for closing the portions, the walls however being perforated by orifices, and, for one of the portions, circular and parallel peaks established on the wall of said portion adjusted towards the other of the portions where they approximately touch the wall and delimiting grooves with some of the latter not having any orifices, the orifices of the other portion being situated so that they open according to the differential heat expansions in the turbo aero engine at different operating conditions, either in front of the grooves without orifices for certain conditions or in front of other grooves for other conditions.

The drawing off zones may be one portion of the combustion chamber or an adjacent portion of the compressors of the turbo aero engine.

BRIEF DESCRIPTION OF THE DRAWINGS

The invention is now to be described in more detail with the aid of the accompanying figures given solely by way of non-restrictive illustration.

DETAILED DESCRIPTION OF THE PREFERRED EMBODIMENTS

Figure 1:
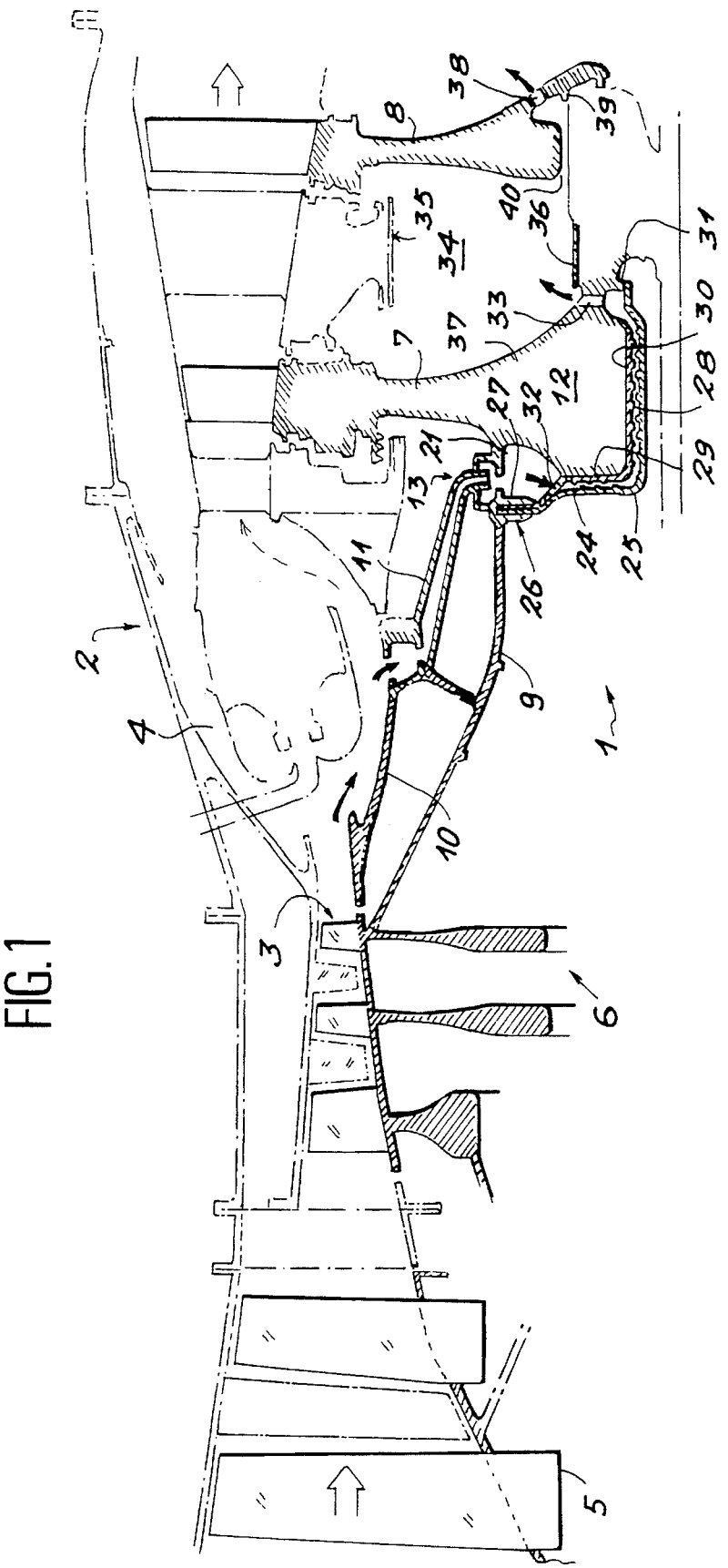
FIG. 1 shows a general cross-sectional view of one embodiment of the turbo aero engine of the invention.

The turbo aero engine shown partially on FIG. 1 is composed of a rotor 1 surrounded by a stator 2 and between which extends is an annular gas flow vein 3 occupied by fixed and mobile vane stages and by a combustion chamber 4. Successively, there is a low pressure compressor 5, a high pressure compressor 6, the combustion chamber 4, a high pressure turbine 7 and a low pressure turbine 8 through the annular vein 3. The compressors 5 and 6 and the turbines 7 and 8 belong to the rotor 1, which thus includes in particular a revolution wall 9 which connects the high pressure compressor 6 to the low pressure turbine 7 and which surrounds an internal wall 10 of the combustion chamber 4. In this first embodiment of the invention and in the next three, pipes 11 are established between the walls 9 and 10 and extend from the bottom of the various portions of the combustion chamber 4 to one annular portion of the wall 9 which touches the disk of the high pressure turbine 7 and more specifically a central portion—close to the axis of the turbo aero engine—of this disk. This central portion is denoted by 12 on FIG. 1 and ressembles a bulb as it is much thicker than the rest of the disk, which explains why these turbine disks are often called leek-shaped disks.

Only one of the pipes 11 is shown on the figure, but the others are similar and distributed around the wall 9.

Figure 2:
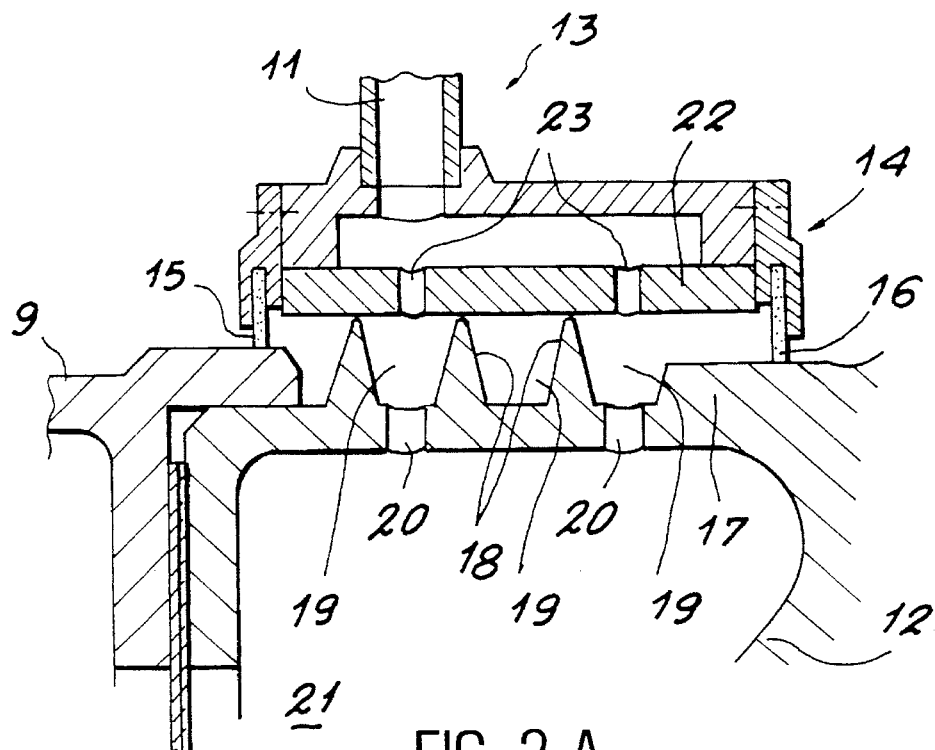
FIGS. 2A and 2B show cross-sectional views of the main element of the invention.
Figure 2:
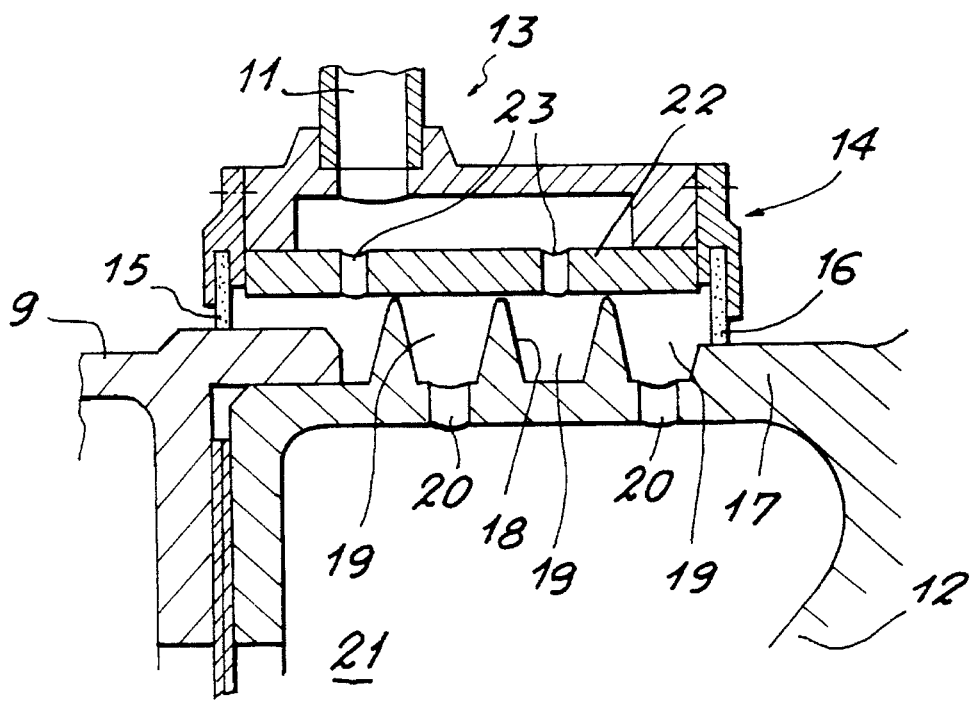

The pipes 11 are rigidly fixed to the wall 10 and connected to the wall 9 by a joint 13 which is shown in detail on FIGS. 2A and 2B. It can be seen that the pipes 11 are fitted at this location with two gaskets which may be circular parallel brush joints 15 and 16 which rub on the wall 9, or more particularly in the present case, on an extension 17 of this wall 9 formed of an element with the disk of the turbine 7. All the pipes 11 converge in the orifice 14 which thus constitutes a chamber for collecting the drawn off gas.

Tongues 18 are established on the extension 17 of the wall 9. These are circular parallel peaks tapered at their free end. They delimit grooves 19 whose bottoms are alternately full and provided with a orifice 20 which traverses the extension 17 and opens into a chamber 21 having one face delimited by the bulb 12. The orifice 14 is covered by a plate 22 situated in front of the edges of the tongues 18 and which is covered with an erodable material 50 on the face orientated towards the tongues 18 or solely composed of this material whose main characteristic is of being eroded easily by the rubbing of the tongues 18 so as to only allow a minimal amount of play to exist according to the real conditions for adjusting the parts and the original heat expansions. The plate 22 is perforated with orifices 23 whose spacing pitch in a longitudinal direction is similar to that of the orifices 20 so that they are approximately an extension of them in the situation shown on FIG. 2A but are offset and at a middistance from them in the situation shown on FIG. 2B, which expresses in relation to FIG. 2A a relative axial displacement of the pipes 11 and groove 13 with respect to the extension 17 of the wall 9, the turbine 7 and the rotor 1. The result is that, if the original gases of the combustion chamber 4 flow freely into the chamber 21 after having freed the pipes 11, orifices 23, grooves 19 and orifices 20 in the situation shown on FIG. 2A, communication is almost interrupted in the situation shown on FIG. 2B as the orifices 23 of the plate 22 open into the grooves 19 without the orifices 20. The situation of FIG. 2B is obtained on revving up of the turbo aero engine when the heating of the structures is much more sensitive in certain portions of the stator 2 and in particular close to the combustion chamber 4 where combustion is strengthened: the pipes 11 undergo a longitudinal movement towards downstream with respect to the rotor 1 and the hot gases of the combustion chamber 4 expand freely into the chamber 21 so as to heat the bulb 12 by blowing onto it and thus reduce the heat gradient in the disk of the high pressure turbine 7.

When the rate has stabilized, the heat differential reduces, the rotor 1 corrects its delay on heating and in turn expands towards upstream: the joints 15 and 16 slide onto the wall 9 or its extension 17, the tongues 18 passing in front of the plate 22 and the orifices 23, and the heating of the bulb 12 ceases when it would be able to introduce a new heat gradient after having corrected the previous one.

Reference is now made again to FIG. 1 to explain in more detail on how the bulb 12 is heated. A pair of plates 24 and 25 is picked up at one end between the radial and parallel ribs 26 and 27 of the wall 9 and of the extension 17. The plates 24 and 25 then have different shapes spreading and delimiting a play 28 close to the bulb 12. More specifically, the plate 24 touches the bulb 12 on its upstream lateral face 29 and on its bore face 30 and the plate 25 extends a small distance, is surrounded by the plate 24 and is connected via its end opposite the one, which is gripped with a small ring 31, to the downstream end of the bore of the bulb 12. Moreover, the plates 24 and 25 are ribbed relief surfaces formed of imbricated projections so that the play 28 forms zigzags.

Orifices 32 traverse the plate 24 at the location where it extends in front of the chamber 21 before rejoining the bulb 12, as well as other orifices 33 provided through one downstream and tapered portion of the bulb 12 at a location which is no longer covered by the plate 24 and which is close to the small ring 31, thus enabling the heating gas previously having entered the chamber 21 to go round the bulb 12 by traversing the play 28 which heats it via the faces 29 and 30. When the gas has freed the outlets 33 of the play 28, it spreads into a chamber 34 situated between the high 7 and low 8 pressure turbines and delimited in addition outside by a confining ring 35 integral with the stator 2 and inside by a ferrule 36 belonging to the rotor 1. It then contributes in heating the downstream face 37 of the bulb 12 and the disk of the low pressure turbine 8 which it goes round in the same way as the ferrule 36 forms a play with the bore 40 of the disk of the low pressure turbine 8. The gas is caught there before moving into other portions of the machine situated more downstream via orifices 38 traversing the disk of the low pressure turbine 8. The ferrule 36, like the plate 25, is connected to a small ring 39 of the disk of the low pressure turbine 8 adjacent to the outlets 38.

This embodiment provides a good exchange of heat between the gas and the bulb 12. It is also possible to suppress the plate 24 and replace the plate 25 by a smooth plate so as to obtain a faster circulation of the gas.

Figure 3:
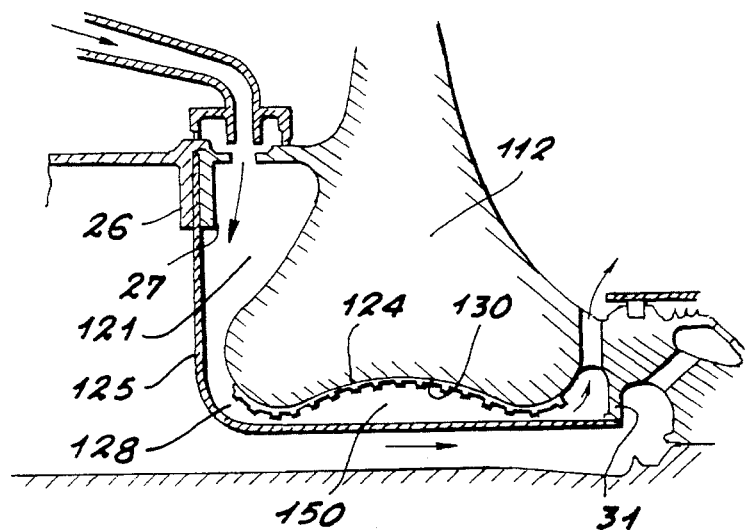
FIGS. 3 to 9 represent cross-sectional views of seven other embodiments of the invention, FIG. 6 being completed by an enlargement 6A of one of its details.

In the embodiment of FIG. 3, the portions similar to those of the preceding embodiment but somewhat modified bear the same references increased by 100, the similar portions keep the same references and the completely new portions bear other references preceded by 100. This method shall also be used to describe the following embodiments. The bulb 112 has a bilobate shape, the plate 124, provided as previously with projections and notches, is fixed solely to the bore face 130 of the bulb 112 and does not extend further, and the plate 125 is smooth and only clamped between the ribs 26 and 27. The chamber 121 opens directly in the play 128 which significantly widens between the lobes of the bulb 112 as the plate 125 is straight as far as the small ring 31. This embodiment constitutes a compromise between that of FIG. 1 where the exchage of heat is extremely good and the one mentioned in the preceding parapgraph and which is particularly simple by virtue of the sole smooth plate. The advantages and drawbacks of these two preceding embodiments are thus mitigated in this instance.

Figure 4:
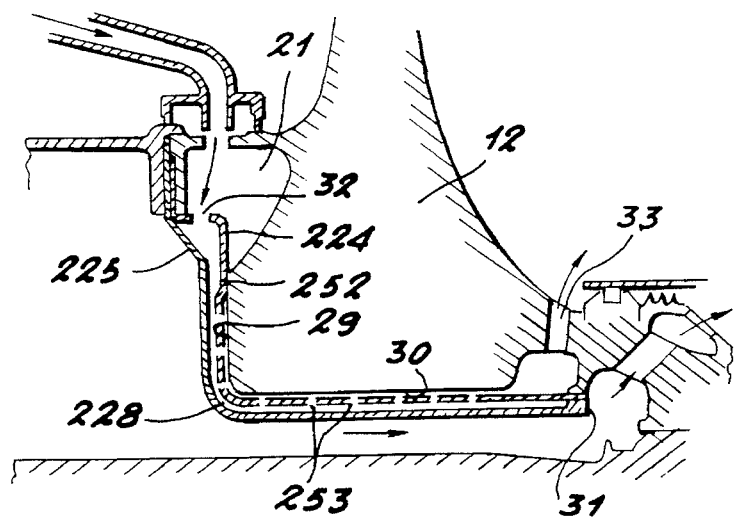

Thus, the bulb 12 of the first embodiment is found on the third, that of FIG. 4, but the plates 224 and 225 are now both kept smooth. The plate 225 is moreover almost similar to that of the second embodiment, but the plate 224 extends between the ribs 26 and 27 and the small ring 31 and only touches the bulb 12 for a short extent 252 close to the chamber 21, beyond which it is separated from it and extends into the middle of the play 228 where it divides into two. It is here at this location in front of the faces 29 and 30 that it is drilled so that the heating gas originally circulating between the plates 224 and 225, after having freed the orifices 32, progressively traverses the perforations 253 of the plate 224 and is projected onto the bulb 12 perpendicularly to its faces 29 and 30 before resuming the flow towards the outlets 33. Thus, excellent exchange of heat is obtained in this embodiment.

Figure 5:
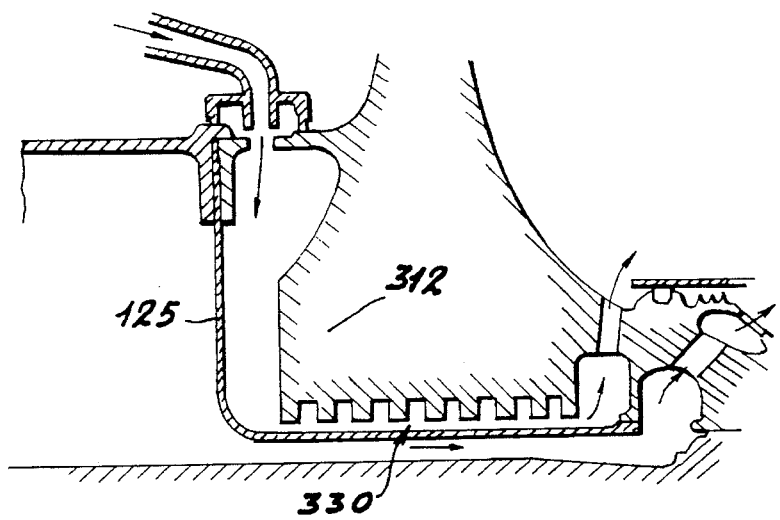

In the embodiment of FIG. 5, there is only one smooth plate 125 similar to that of the second embodiment and the bulb 312 is formed with a notched bore face 330, the aim again being to produce turbulences in the flow of gas so as to increase the exchange of heat. The projections and notches are as previously circular and alternate in a longitudinal direction.

Figure 6:
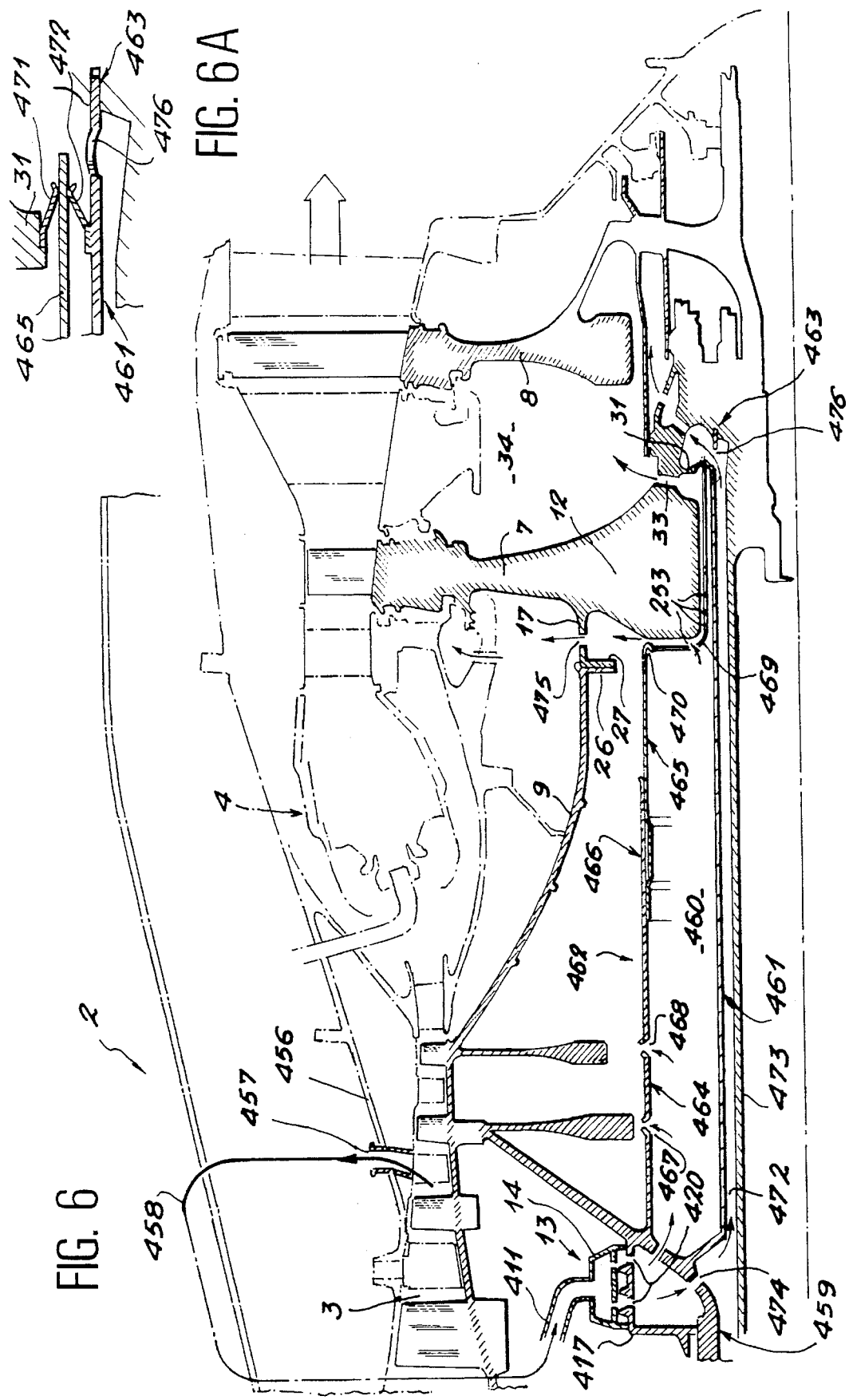

The embodiment of FIG. 6, like the following ones, is significantly different, although it is possible to have compromises with the preceding embodiments. In fact, it is possible to avoid taking heating gas from the combustion chamber but from portions of the turbo aero engine situated more upstream and in particular close to one of the compressors 5 and 6. In this case, the wall of the stator 2, which delimits the annular vein 3 and which bears the reference 456, may be provided with perforations 457 through which the drawn off gas flows which reaches pipes 411 similar to the preceding ones 11 but situated much more upstream of the turbo aero engine, indeed upstream of the compressors 5 and 6, via a transit pipe 458. As previously, the pipes 411 are connected rigidly to the stator 2 by a device (not shown) and a joint 13 similar to that of FIG. 2 connects the pipes 411 to a portion of the rotor 1 and more specifically to a wall bearing the reference 459. In the present case, the wall 459 is conical and the orifice 14 thus touches a circular surface 417 which belongs to a swelling established to this effect on the wall 459. The orifices 420 open into a chamber 460 whose shape is completely original as it concerns an elongated annular chamber delimited by two concentric cowlings 461 and 462. The internal cowling 461 extends between the wall 459 and a throat 463 situated downstream of the bulb 12 of the high pressure turbine 7, slightly downstream of the small ring 31. The external cowling 462 is composed of one upstream portion 464 and one downstream portion 465 which prolongs the first one. The portions 464 and 465 are able to slide onto each other by means of overlapping portions 466 if it is desired to free the bulb 12 in order to mount or dismantle the disk. One inherent advantage in this category of embodiments is that the heat gradient undergone by the disks of the high pressure compressor 6 is also reduced if the gas, already taken and heated, is partly blown onto the bore faces of the disks of the compressor 6 by passing though perforations 467 and 468 established in two circles at the right of said bore faces on the upstream portion 464 of the external cowling 462.

The downstream portion 465 of the external cowling 462 extends in front of the bulb 12 and more specifically in front of its upstream face 29 and its bore face 30 by a drilled portion 469 which evokes FIG. 4. In fact, it is pierced with orifices 253 making it possible to blow air taken perpendicularly at the faces 29 and 30 of the bulb 12. A protuberance 470 of the downstream portion 465, established immediately upstream of the drilled zone 469, limits any gas leaks upstream of the disk of the high pressure turbine 7, but one portion of the gas flows to this location and contributes in slightly heating the rest of the disk on the upstream side by subsequently traversing the wall 9 or its extension 17, as well as other walls by recesses 475. Most of the air, however, passes into the outlets 33 and then into the chamber 34, as in the preceding embodiments. The downstream end of the downstream portion 465 is provided with elastic lips (FIG. 6A): one external lip 471 pressed against the small ring 31 and one internal lip 472 pressed against the internal cowling 461. Thus, an absence of any gas leak on this side and good holding of the external cowling are both guaranteed.

The pipes 411 or certain of them may also open into a gap 472 between the internal cowling 461 and a rotor tube 473 surrounded by the latter by passing through additional orifices 474 fitted in the wall 459. Perforations are then provided on the internal cowling 461 close to the zone 463. They bear the reference 476 and enable the gas picked up to flow towards other portions of the turbo aero engine.

Figure 7:
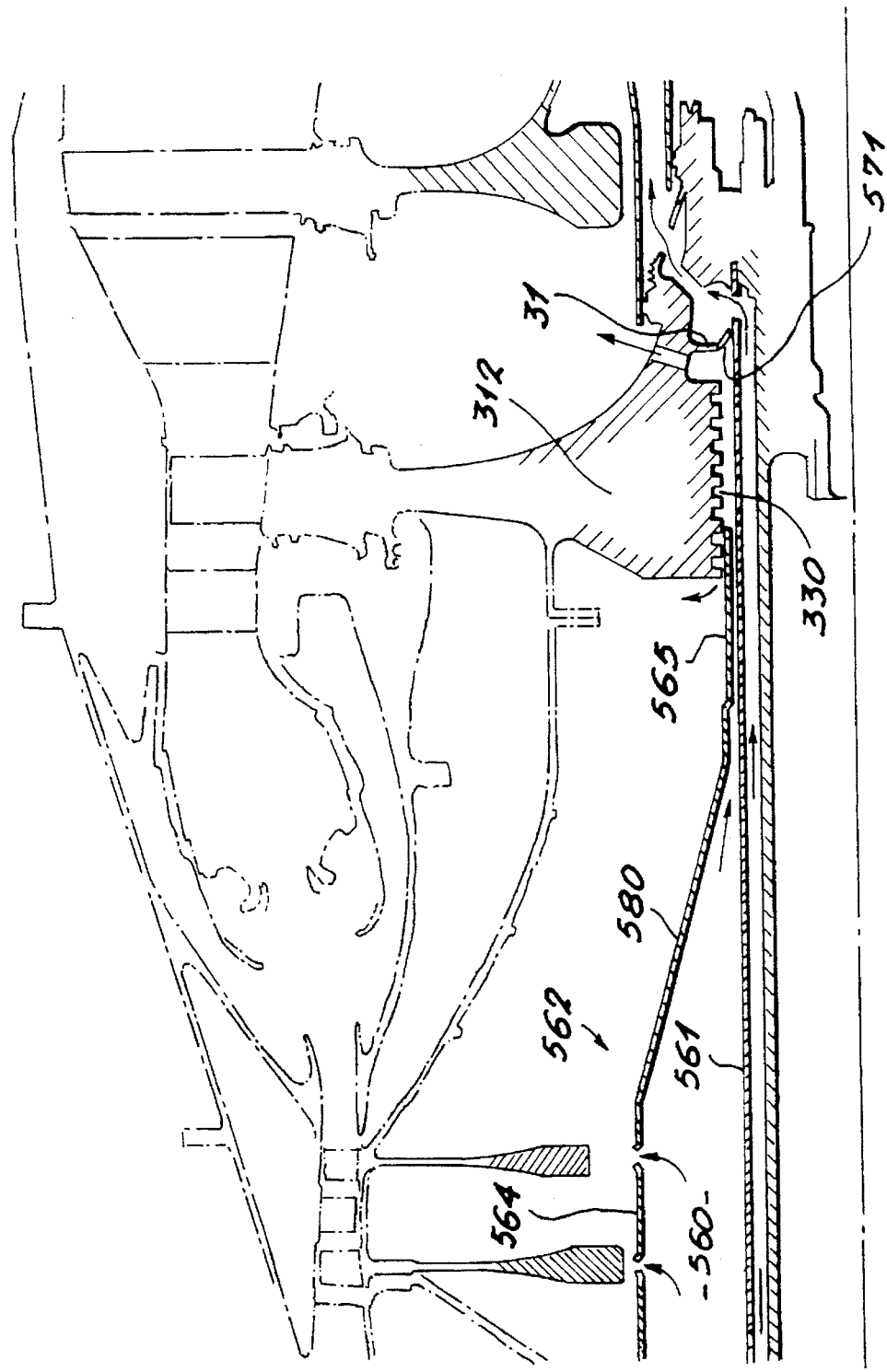

On FIG. 7, the cowlings bear the references 561 and 562 and differ from the preceding ones in that firstly the internal cowling 561 is pressed against the small ring 31 by a lip 571 and in that the external cowling 562, again formed from one upstream portion 564 and one downstream portion 565, has a conical section 580 and stops in front of the notched bore face 330 of the bulb 312 of FIG. 5. The chamber 560 is thus tapered more downstream.

Figure 8:
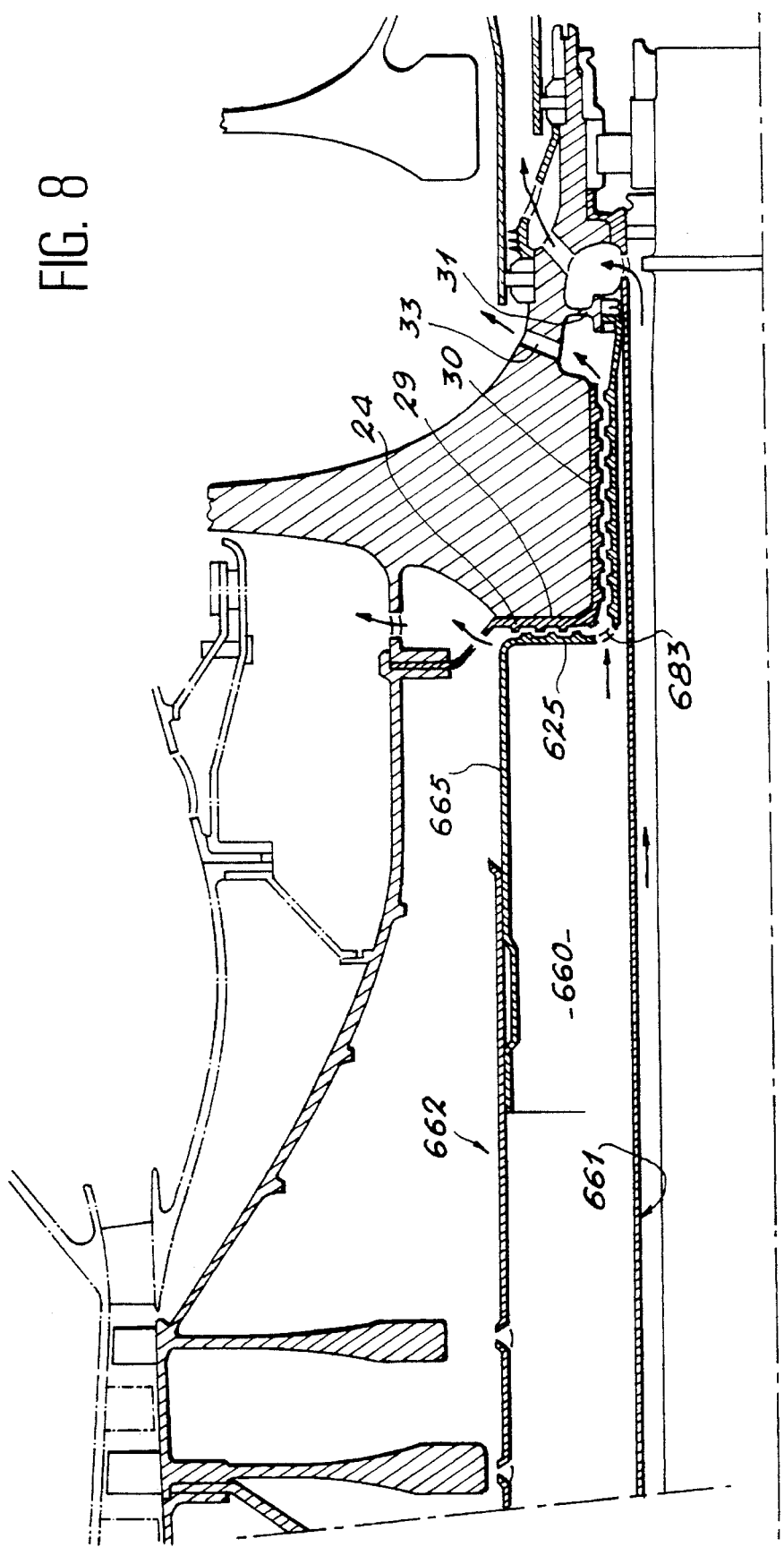

FIG. 8 resembles FIG. 1 in that the downstream portion 665 of the external cowling 662 is provided with an end portion 625 which evokes the plate 25 of this embodiment; the plate 24 is maintained as such and the gas leaves the intermediate chamber 660 between the cowlings 661 and 662 by traversing perforations 683 established through the downstream portion 665 in front of the joining point of the faces 29 and 30. It climbs up along the disk, either on the upstream side via the front face 29, or on the downstream side via the bore face 30 and the outlets 33. In this embodiment, the cowlings 661 and 662 both press on the small ring 31.

Figure 9:
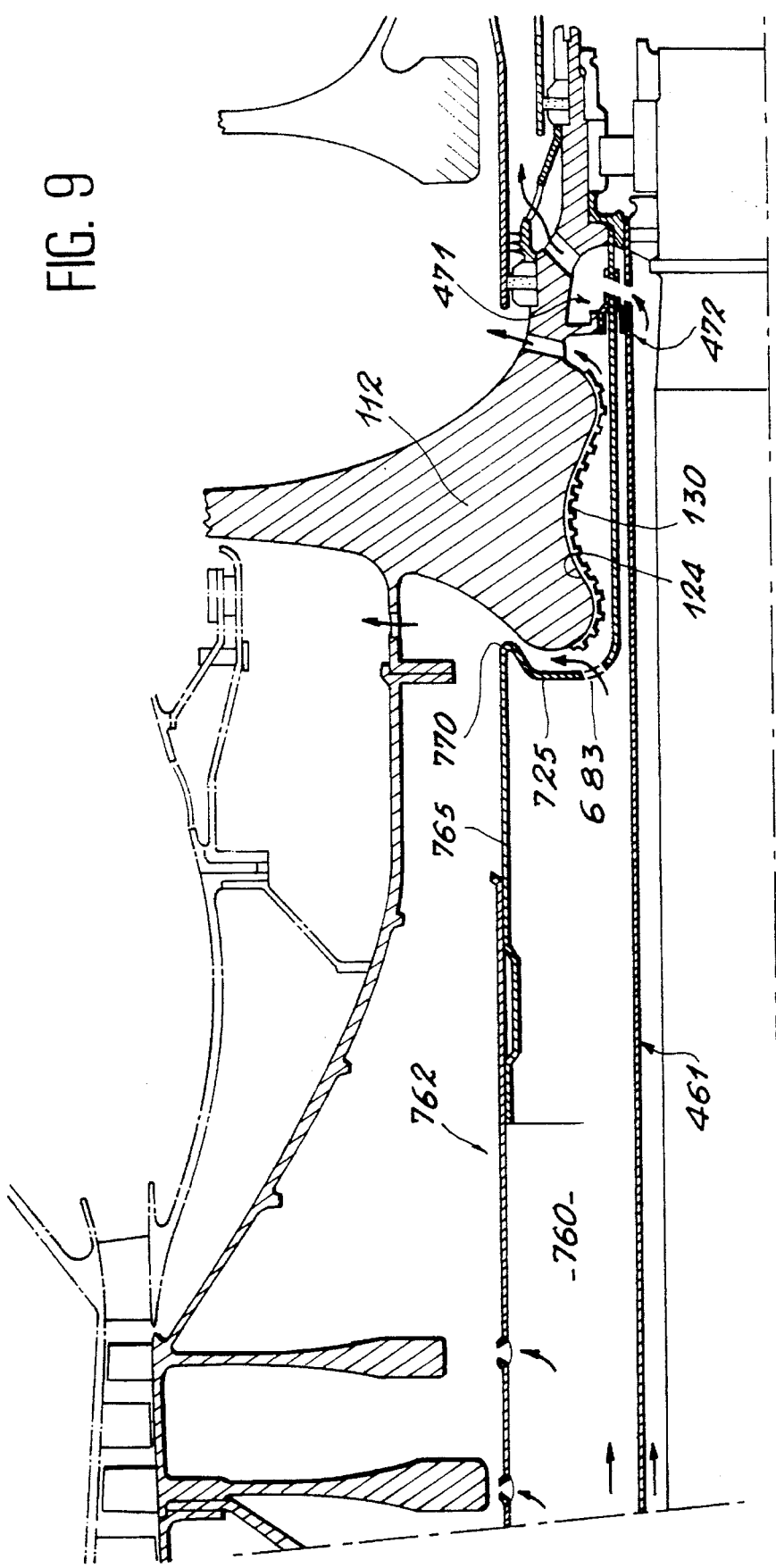

Finally, the embodiment of FIG. 9 mostly ressembles that of FIG. 3 as in particular it shows the bilobate bulb 112 and a curved plate 124 which marries the hollow bore face 130; the downstream portion 765 of the cowling 762 is significantly profiled like the plate 125 at the location 725 situated in front of the bilobate bulb 112, and the external cowling 762 is pressed by the lips 471 and 472 opposite the small ring 31 and the internal cowling 461. Perforations 683 allow the gas the leave the chamber 760 so as to blow on the bilobate bulb 112 in front of the entrance of the bore face 130. Here again, a protuberance 770 is provided in front of the location 725 so as to limit any leaks towards the upstream face of the disk of the high pressure turbine 7 by narrowing the passage the gas needs to take.

The embodiments of FIGS. 6 to 9 may in addition be modified by adopting certain known dispositions, such as the adding of a flow adjustment valve to the transit pipe 458 of FIG. 6 and by replacing the joint 13 by a conventional brush joint.

What is claimed is:

1. A turbo aero engine including a rotor, a stator, a combustion chamber upstream of a turbine belonging to the rotor and party constituted by a disk, wherein it includes a channel for sending and blowing hot gas from a drawing off zone of the turbo aero engine to a central zone of the disk, the sending channel being composed of a portion opening into the drawing off zone and integral with the stator, and another portion integral with the rotor, the two portions being joined by an annular assembly including concentric walls for closing the portions, the walls, however, being perforated by orifices, and further including for one of the portions, circular parallel peaks established on the wall of said one portion being adjusted towards the other of the portions where the peaks approximately touch the wall, and delimiting grooves with certain of the grooves having no orifices, the orifices of the other portion being situated so that, according to the differential heat expansions in the turbo aero engine at different operating conditions, they open either in front of the grooves without orifices for certain conditions or in front of the grooves with orifices for other conditions.

2. The turbo aero engine according to claim 1, wherein the wall of one of the portions is covered with an erodable material in front of the peaks.

3. The turbo aero engine according to claim 1, wherein the portion of the communication channel belonging to the rotor in front of the central zone renders the gases turbulent.

4. The turbo aero engine according to claim 3, wherein the channel comprises reliefs situated on the central zone.

5. The turbo aero engine according to claim 1, wherein the portion of the communication channel belonging to the rotor in front of the central zone deviates the gases towards the blowing zone of the channel.

6. The turbo aero engine according to claim 5, wherein the channel comprises a drilled plate close to the central zone and overlapping it.

7. The turbo aero engine according to claim 1, wherein the drawing off zone is a portion of the combustion chamber.

8. The turbo aero engine according to claim 1, wherein the drawing off zone is an adjacent portion of a compressor upstream of the combustion chamber.

9. The turbo aero engine according to claim 8, wherein the portion of the communication channel integral with the rotor includes orifices for blowing gas towards the central zones of compressor disks of the turbo aero engine.

10. The turbo aero engine accoridng to claim 8, wherein the portion of the communication channel integral with the rotor includes two concentric cowlings between which the communication channel is annular.

11. The turbo aero engine according to claim 10, wherein the cowling surrounding the other cowling extends as far as the central zone of the turbine disk without overlapping it.

12. The turbo aero engine according to claim 10, wherein the cowling surrounding the other cowling extends beyond the central zone of the turbine disk and is pierced or drilled in front of the central zone.

13. The turbo aero engine according to claim 12, wherein the cowling surrounding the other cowling is composed of two portions partially overlapping and being able to slide into the other.

\* \* \* \* \*